(12) United States Patent
Hoekstra et al.

(10) Patent No.: US 6,299,315 B2
(45) Date of Patent: Oct. 9, 2001

(54) DIGITAL ELECTROCHROMIC MIRROR SYSTEM

(75) Inventors: Eric J. Hoekstra, Holland; Kenneth L. Schierbeek, Zeeland, both of MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/820,017

(22) Filed: Mar. 28, 2001

Related U.S. Application Data

(60) Continuation of application No. 09/519,767, filed on Mar. 6, 2000, now Pat. No. 6,210,008, which is a division of application No. 09/353,026, filed on Jul. 13, 1999, now Pat. No. 6,056,410, which is a continuation-in-part of application No. 08/832,380, filed on Apr. 2, 1997, now Pat. No. 6,089,721.

(60) Provisional application No. 60/117,633, filed on Jan. 28, 1999, and provisional application No. 60/103,721, filed on Oct. 9, 1998.

(51) Int. Cl.$^7$ ............................... G02B 5/08; G02B 17/00
(52) U.S. Cl. ........................ 359/603; 359/608; 359/267
(58) Field of Search ..................................... 359/601, 602, 359/603, 604, 608, 265, 266, 267; 307/9.1

(56) References Cited

U.S. PATENT DOCUMENTS

| 4,205,903 | 6/1980 | Inami et al. . |
| 4,298,870 | 11/1981 | Saegusa ............................ 340/785 |
| 4,443,057 | 4/1984 | Bauer et al. . |
| 4,512,637 | 4/1985 | Ballmer . |
| 4,529,275 | 7/1985 | Ballmer . |
| 4,529,873 | 7/1985 | Ballmer et al. ..................... 250/201 |
| 4,603,946 | 8/1986 | Kato et al. . |
| 4,669,825 | 6/1987 | Itoh et al. . |
| 4,793,690 | 12/1988 | Gahan et al. . |
| 4,886,960 | 12/1989 | Molyneux et al. .................. 250/209 |

(List continued on next page.)

FOREIGN PATENT DOCUMENTS

WO9914619   3/1999   (WO) .

*Primary Examiner*—Cassandra Spyrou
*Assistant Examiner*—Mark A. Robinson
(74) *Attorney, Agent, or Firm*—Van Dyke, Gardner, Linn & Burkhart, LLP

(57) ABSTRACT

A vehicular electrochromic rearview mirror system is provided including an interior electrochromic rearview mirror assembly and at least one exterior electrochromic rearview mirror assembly. The interior rearview mirror assembly has an interior electrochromic reflective element that assumes a partial reflectance level in response to a first drive signal applied thereto. The exterior rearview mirror assembly has an exterior electrochromic reflective element that assumes a partial reflectance level in response to a second drive signal applied thereto. A drive circuit is provided that supplies a first drive signal to the interior electrochromic reflective element and a second drive signal to the exterior electrochromic reflective element. The drive circuit variably controls a relationship between the partial reflectance levels of the interior reflective element and the exterior electrochromic reflective element by a control signal. The interior electrochromic reflective element has a partial reflectance level that is greater than or equal to the partial reflectance level of the exterior electrochromic reflective element.

73 Claims, 5 Drawing Sheets

U.S. PATENT DOCUMENTS

| | | | |
|---|---|---|---|
| 4,896,030 | 1/1990 | Miyaji | 250/201 |
| 4,917,477 | 4/1990 | Bechtel et al. | |
| 5,076,673 | 12/1991 | Lynam et al. | 359/271 |
| 5,122,647 | 6/1992 | Lynam et al. | 250/201.1 |
| 5,148,014 | 9/1992 | Lynam et al. | 250/214 AL |
| 5,193,029 | 3/1993 | Schofield et al. | 359/604 |
| 5,220,317 | 6/1993 | Lynam et al. | 340/785 |
| 5,384,578 | 1/1995 | Lynam et al. | 345/105 |
| 5,416,313 | 5/1995 | Larson et al. | 250/214 AL |
| 5,424,898 | 6/1995 | Larson et al. | 361/101 |
| 5,451,822 | 9/1995 | Bechtel et al. | 307/9.1 |
| 5,486,952 | 1/1996 | Nagao et al. | 359/603 |
| 5,530,240 | 6/1996 | Larson et al. | 250/214 AL |
| 5,550,677 | 8/1996 | Schofield et al. | 359/604 |
| 5,614,891 | 3/1997 | Zeinstra et al. | 340/825.22 |
| 5,675,438 | 10/1997 | Nagao et al. | 359/603 |
| 5,715,093 | 2/1998 | Schierbeek et al. | 359/601 |
| 5,786,772 | 7/1998 | Schofield et al. | 340/903 |
| 5,798,575 | 8/1998 | O'Farrell et al. | 307/10.1 |
| 5,818,625 * | 10/1998 | Forgette et al. | |
| 6,056,410 | 5/2000 | Hoekstra et al. | 359/603 |
| 6,089,721 | 7/2000 | Schierbeek | 359/603 |

* cited by examiner

DIGITAL ELECTROCHROMIC MIRROR SYSTEM

CROSS-REFERENCE TO RELATED APPLICATIONS

This application is a continuation of application Ser. No. 09/519,767, filed on Mar. 6, 2000, by Eric J. Hoekstra and Kenneth L. Schierbeek, now U.S. Pat. No. 6,210,008, which is a division of application Ser. No. 09/353,026, filed on Jul. 13, 1999, by Eric J. Hoekstra and Kenneth L. Schierbeek, now U.S. Pat. No. 6,056,410, which is a continuation-in-part of application Ser. No. 08/832,380 filed on Apr. 2, 1997, by Kenneth L. Schierbeek now U.S. Pat. No. 6,089,721, the disclosures of which are hereby incorporated herein by reference, and further claims priority from provisional patent applications Serial No. 60/103,721 filed on Oct. 9, 1998, by Kenneth Schofield and Kenneth L. Schierbeek, and Ser. No. 60/117,633 filed on Jan. 28, 1999, by Kenneth Schofield and Kenneth L. Schierbeek, the disclosures of which are hereby incorporated herein by reference.

BACKGROUND OF THE INVENTION

This invention relates generally to vehicle rearview mirror systems and, more particularly, to electrochromic mirror systems, including an interior electrochromic rearview mirror assembly and at least one exterior electrochromic rearview mirror assembly.

An electrochromic rearview mirror assembly includes an electrochromic reflective element that responds to a signal applied across a pair of terminals by varying the light reflected by the reflective element. In this manner, the reflectance level of the reflective element can be varied by varying the signal applied to the electrochromic cell. The electrochromic reflective element has characteristics which makes control of its reflectance level difficult. The electrochromic reflective element operates at a relatively low voltage, which typically may not exceed approximately 2 volts DC, more typically not more than about 1.5 volts DC, for more than a brief period of time or else useful life of the reflective element is compromised. Furthermore, the amount of voltage necessary to establish a particular value of the light transmissivity of the cell varies with the temperature of the cell, the amount of change in light transmittance undertaken, and the surface area of the cell. Therefore, optimum control of the electrochromic reflective element may require more than merely applying a DC voltage corresponding to the desired reflectance level.

Electrochromic mirror systems have incorporated therein many additional electronic functions in addition to mirror drive. These include compass functions; namely, determination and display of vehicle heading, display of the interior and/or exterior temperature as well as other functions as disclosed in commonly assigned U.S. Pat. No. 5,798,575, the disclosure of which is hereby incorporated herein by reference. By combining multiple functions in a single system, it is possible to utilize the computational power of a microcomputer in order to perform a wide range of functions. Although a microcomputer has extensive computational capability, its ability to supply a drive signal to external components, such as an electrochromic cell, is limited. Therefore, it has been necessary to provide an interface circuit between the microprocessor and the electrochromic cell in order to supply the electrochromic cell with a desired reflectance level established by the microcomputer. U.S. Pat. No. 5,451,822 integrates a Pulse-Width Modulated (PWM) output of a microcomputer and amplifies the integrated PWM signal utilizing a conventional analog DC amplifier. The use of analog components to amplify the output of the microcomputer not only increases the cost of the system, but, additionally, increases its power consumption. The increase in power consumption requires larger components, which increases the physical size of the assembly and also increases the necessity for enhanced heat dissipation capabilities.

In published International Publication No. WO 99/14619, a plurality of electrochromic mirror elements used in an automobile are controlled by individual drive circuits for each of the electrochromic elements. The individual drive circuits are supplied with PWM signals generated by a microcomputer from photosensors positioned inside the automobile. Additionally, separate glare signals are supplied to each of the electrochromic elements such that the reflected light at a predetermined reference point is relatively constant. The system described in Publication No. WO 99/14619 multiplies the number of analog components and the increase in energy consumption resulting therefrom. Thereby, not only is the advantage derived from the generation of digital signals by the microcomputer not realized, the problems associated with analog circuitry are multiplied.

In U.S. Pat. No. 5,675,438 complementary push-pull transistors, connected between positive and negative voltages of positive 1.6 volts DC and negative 1.6 volts DC, respectively, are operated by an oscillation circuit to supply drive pulses to an electrochromic mirror. The duty factor of the pulses are adjusted by the oscillation circuit in response to light levels sensed by forward and rearward facing light sensors. Power supplies convert positive 12 volt vehicle battery voltage to the positive 1.6 volt and negative 1.6 volt levels needed to operate the push-pull transistors. The power supplies add components to the circuit and increases the power consumption thereof.

SUMMARY OF THE INVENTION

The present invention provides a vehicular electrochromic mirror system which significantly reduces the power consumption and thereby the component size and heat dissipation requirements thereby beneficially utilizing the digital output of a digital controller. Furthermore, the present invention provides an electrochromic vehicular mirror system in which the interior rearview mirror assembly and exterior rearview mirror assemblies are all commonly driven off of a common drive circuit.

According to an aspect of the invention, a vehicular electrochromic rearview mirror system includes at least one electrochromic rearview assembly having an electrochromic reflective element. The electrochromic reflective element assumes a partial reflectance level in response to a signal applied thereto. The system further includes a drive circuit applying a drive signal to the electrochromic reflectance element establishing a partial reflectance level of the reflective element. The drive circuit includes a digital controller and a switching power supply controlled by the digital controller producing the drive signal.

In a preferred form, the switching power supply is a switching step-down converter. Most preferably, the switching power supply is a buck converter which includes an inductor and an electronic switch in electrical series connection between the electrochromic reflective element and a voltage source. The use of a switching power supply which is controlled by a digital controller greatly reduces power consumption of the individual components. This may be enhanced by operating the electrical switch in a saturated condition, further reducing power consumption.

According to another aspect of the invention, a vehicle electrochromic rearview mirror system includes an interior electrochromic rearview mirror assembly and at least one exterior electrochromic rearview mirror assembly. The system further includes a plurality of electrochromic reflective elements each associated with an electrochromic rearview mirror assembly. Each of the electrochromic reflective elements assumes a partial reflectance level in response to a signal applied thereto. The system further includes a drive signal that applies a drive signal to each of the electrochromic reflective elements. The drive circuit includes a digital controller, a master drive circuit responsive to the digital controller developing a first drive signal applied to one of the electrochromic cells and a slave drive circuit responsive to the digital controller developing a second drive signal applied to a second of the electrochromic cells. The second drive signal is derived from the first drive signal.

Because the second drive signal is derived from the first drive signal, the reflectance level of the second of the electrochromic cells must necessarily be greater than or equal to the first of the electrochromic cells. While this could reduce the flexibility of control of the reflective elements, it has been discovered that exceptional performance can be achieved along with a substantial reduction in system component count and energy usage. Preferably, the first drive signal derived from the master drive circuit is applied to one or both exterior rearview mirrors and the second drive signal derived from the slave drive circuit is supplied to the interior rearview mirror assembly.

These and other objects, advantages, and features of this invention will become apparent upon review of the following specification in conjunction with the drawings.

DESCRIPTION OF THE PREFERRED EMBODIMENT

Figure 1:
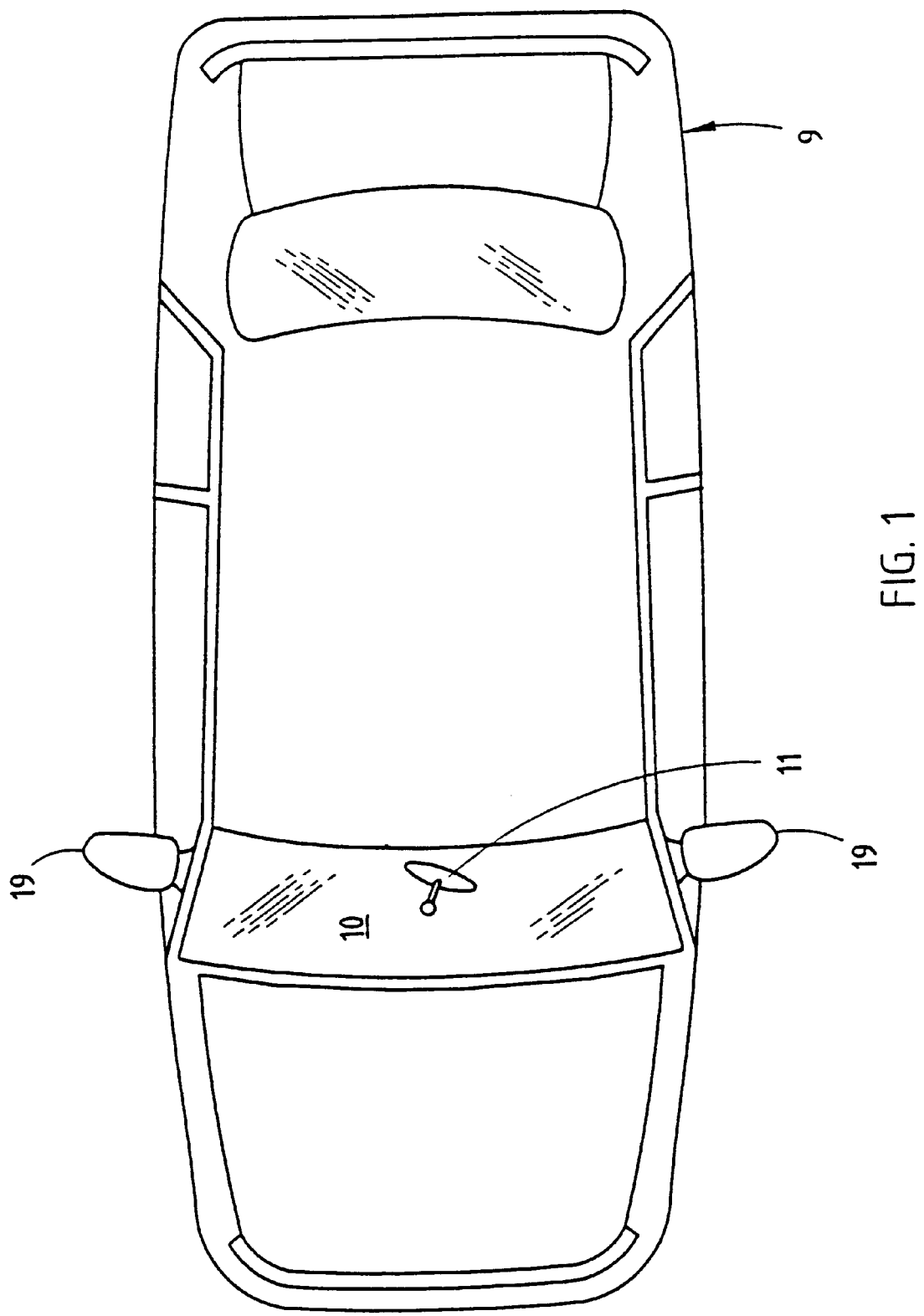
FIG. 1 is a side elevation of a vehicle incorporating an electrochromic mirror system according to invention.

Referring now specifically to the drawings, and the illustrative embodiments depicted therein, a vehicle 9 includes an electrochromic mirror system 10 having an electrochromic interior rearview mirror assembly 11 and one or more exterior rearview mirror assemblies 19 including a driver side rearview mirror assembly 19 on the driver side of the vehicle and/or a passenger side rearview mirror system on an opposite side of vehicle 9 (FIG. 1).

Figure 2:
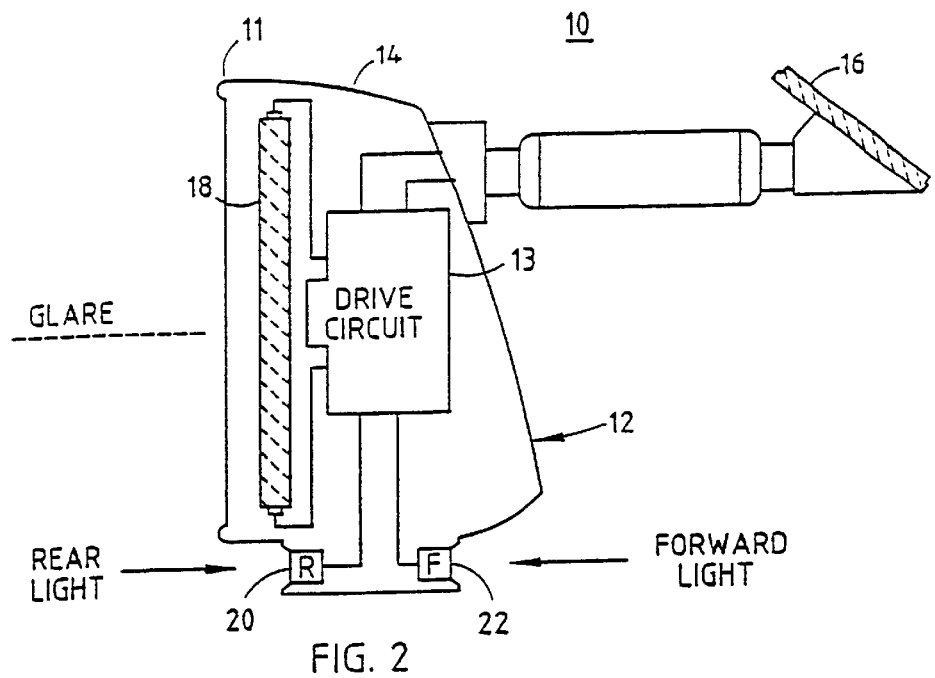
FIG. 2 is a side elevation of a portion of an electrochromic mirror system according to the invention.

Electrochromic mirror system 10 includes an electronic control 12 which, preferably, is positioned within a housing 14 of interior rearview mirror assembly 11 (FIG. 2). Electronic control 12 includes a drive circuit 13 which receives a first input from a rearward-facing light sensor 20, which faces rearwardly in the direction of travel of the vehicle, and a second input from forward-facing light sensor 22, which faces forward with respect to the direction of travel of vehicle 9. Drive circuit 13 supplies a drive signal to electrochromic reflective element 18 included with interior rearview mirror assembly 11. It may also supply a drive signal to other electrochromic reflective elements, such as electrochromic reflective element 24 associated with exterior rearview mirror assembly 19.

In the illustrative embodiment, electronic control 12 may include a display that may be positioned behind reflective element 18 and viewed by the driver through the electrochromic reflective element as disclosed in U.S. Pat. No. 5,285,060, issued to Larson et al., for a DISPLAY FOR AUTOMATIC REARVIEW MIRROR, the disclosure of which is incorporated herein by reference. Alternatively, the display may be positioned on a lip portion of housing 14 below reflective element 18 or on any other portion of the housing visible to the driver as illustrated in commonly assigned U.S. Pat. No. 5,786,772, the disclosure of which is hereby incorporated herein by reference. Alternatively, the display could be in the form of a heads-up display projected from housing 14 on the vehicle windshield.

Electronic control 12 may additionally include a heading sensor, or compass, which produces outputs indicative of the heading of the vehicle. Such heading sensor may be of the magneto-resistive type, such as disclosed in commonly assigned U.S. Pat. No. 5,255,442, issued to Schierbeek et al., for a VEHICLE COMPASS WITH ELECTRONIC SENSOR, or may be of the magneto-inductive type, such as disclosed in commonly assigned provisional patent application Serial No. 60/027,996, filed Oct. 9, 1996, by Domanski for an ELECTRONIC COMPASS, the disclosures of which are hereby incorporated herein by reference, or may be of the flux-gate type, or may be of the magneto-capacitive type.

Electrochromic reflective elements 18 and 24 may be of any type such as disclosed in U.S. Pat. No. 4,902,108 issued to Byker; commonly assigned U.S. Pat. No. 5,140,455 issued to Varaprasad et al.; commonly assigned U.S. Pat. No. 5,910,854 issued to Varaprasad et al. and commonly assigned U.S. Patent application Ser. No. 08/429,643 filed Apr. 27, 1995, by Varaprasad et al. entitled ELECTROCHROMIC MIRRORS AND DEVICES, the disclosures of which are hereby all incorporated herein by reference. Electrochromic reflective elements 18 and 24 include electrochromic units, or cells, that decrease in transmissivity in response to a drive signal applied thereto. The decrease in transmissivity of the electrochromic unit, or cell, results in a decrease in reflectance level of the associated reflective element.

Light sensors 20 and 22 are conventional and may be applied as described in U.S. Pat. No. 4,917,477 issued to Bechtel et al.; U.S. Pat. No. 3,601,614 issued to Platzer, Jr.; and commonly assigned U.S. Pat. No. 4,793,690 issued to Graham et al. and U.S. Pat. No. 5,715,093 issued to Schierbeek et al., the disclosures of which are hereby incorporated herein by reference. Outputs of the light sensors are supplied as inputs to a microcomputer controller 26 which produces an output supplied to a switching power supply 28 (FIGS. 3 and 5–7). Switching power supply 28 reduces a voltage from a voltage source 33 which, preferably, is on an order of magnitude of vehicle ignition voltage to an electrochromic drive signal. Voltage source 33 is between 5 volts DC and 18 volts DC and preferably between 8 volts DC and 12 volts DC. Most preferably, voltage source 33 is a regulated supply of approximately 8 volts DC, which requires minimum voltage reduction from ignition voltage levels of approximately 12 volt nominal, while facilitating a regulated voltage source. Alternatively, voltage source 33 can be vehicle battery voltage or ignition voltage. While use of vehicle battery/ignition voltage eliminates the requirement for even the minimal voltage regulator needed to produce a regulated source at, say, 8 volts DC, the use of an unregulated supply increases the desirability of monitoring voltage across the electrochromic reflective element as discussed in more detail below and as disclosed in commonly assigned application Ser. No. 08/832,380. Drive circuit 13 supplies to electrochromic reflective element 24 a signal with a current capability of at least about 50 milliamperes, preferably of at least about 100 milliamperes and, most preferably of at least about 200 milliamperes.

Figure 5:
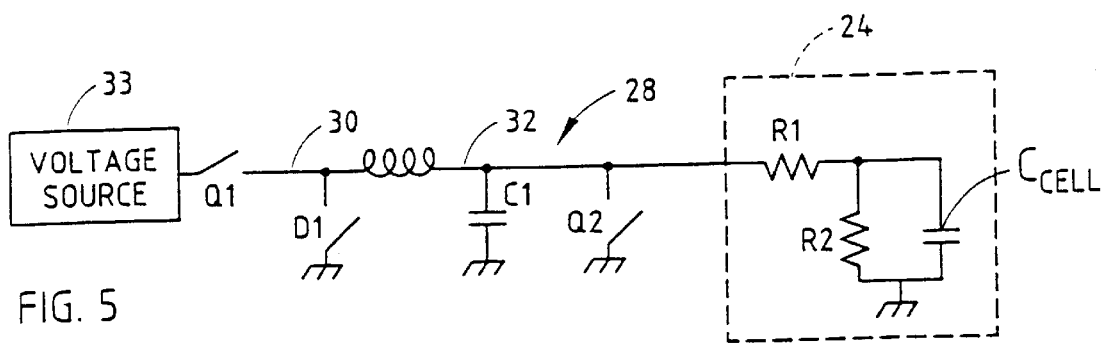
FIG. 5 is a generalized electrical schematic diagram of the drive circuit in FIG. 3.

For solution-phase, single-compartment, self-erasing electrochromic mirror elements commonly used commercially today, the maximum voltage tolerable for a sustained period is in the 1.0 volt to 2.0 volt range, typically less than 1.5 volts, and most typically about 1.4 volts. For solid-film electrochromic devices that utilize a layer, such as a tungsten oxide thin-filmed layer, the maximum voltage tolerable for a sustained period is in the 1.0 volt to the 3.0 volt range, typically in the 1.3 volt to 1.5 volt range. Usually, application of a voltage much in excess of such maximum tolerable voltage to the electrochromic cell for a sustained period, typically at least several seconds, may cause change to the electrochromic medium in the electrochromic cell. Electrochromic reflective element 24 can be modeled as having a series resistance shown as $R_1$ and a shunt resistance shown as $R_2$ (FIG. 5). The series resistance $R_1$ in the model arises from resistance of the electrodes and is on the order of 1 to 2 ohms. Shunt resistance $R_2$ in the model arises from internal losses of the electrochromic cell. When the cell is fully colored, the internal shunt resistance is approximately 10 ohms. The electrochromic element 24 typically develops a voltage, which is the potential stored on the cell. Upon application of external voltage thereto, the electrochromic element temporarily retains said potential even when the external voltage potential is removed and the cell is open-circuited. This property of electrochromic element 24 can be represented in the model by a capacitance C cell which is on the order of a half of farad for an interior mirror electrochromic reflective element. The capacitance will vary as a function of the surface area of the electrochromic reflective element.

Referring now to FIG. 5, switching power supply 28 utilizes an electronic switch $Q_1$ in series electrical connection with an inductor $L_1$ between voltage source 33 and electrochromic element 24. As described above, voltage source 33 is preferably on an order of magnitude of ignition voltage. This eliminates the necessity for additional power supply to drop ignition voltage to an operating voltage level of electrochromic element 24. By eliminating the requirement for an additional power supply, a reduction in component cost and size, as well as power consumption, can be realized. Switching power supply 28 additionally includes a second switch $D_1$ connected between a junction 30, which is the junction between switch $Q_1$ and inductor $L_1$, and ground. Switch $D_1$ is operated oppositely of switch $Q_1$ such that whenever switch $Q_1$ is open, switch $D_1$ is closed and vice versa. Switching power supply 28 preferably additionally includes a capacitor $C_1$ connected between a junction 32, which is a junction between inductor $L_1$ and cell 24, and ground. Switching power supply 28 may additionally includes a third switch $Q_2$ which is connected in parallel with capacitor $C_1$ between junction 32 and ground. Switch $Q_2$ is for the purpose of rapidly removing charge from element 24 when it is desired to cause the reflective element to assume a high reflectance state, such as when the vehicle is placed in reverse gear and the like.

Operation of switching power supply 28 can be understood by reference to Pig. 7 in which the waveform $V_{DIODE}$ is the voltage across switch $D_1$, the waveform $I_{INDUCTOR}$ is the current through inductor $L_1$ and the waveform $V_{CELL}$ is the voltage across electrochromic cell 24. Whenever switch $Q_1$ is closed, voltage $V_{DIODE}$ increases to the voltage level of voltage source 33 which, in the illustrated embodiment, is approximately 8 volts DC. Whenever switch $Q_1$ is open, the voltage $V_{DIODE}$ decreases to around 0 volts DC. If switch $D_1$ is a diode, then $V_{DIODE}$ decreases to one diode forward drop below 0 volts which is approximately negative 0.6 volts DC. This voltage level is sufficient to cause switch $D_1$ to conduct if $D_1$ is a diode. Other schemes would suggest themselves to the skilled artisan for providing a second switch other than a diode for switch $D_1$ as will be described particularly in reference to the drive circuit 13" in FIG. 10. In operation, when switch $Q_1$ is closed, voltage level V causes a current to flow through inductor $L_1$ which stores energy in the inductor in addition to causing a current to flow through electrochromic cell 24. When switch $Q_1$ opens, the decrease in $V_{DIODE}$ causes switch $D_1$ to become conducting, which conducts the current from inductor $L_1$ in order to allow the current in inductor $L_1$ to continue flowing as energy is discharged from inductor $L_1$. As can be seen from the waveform $I_{INDUCTOR}$ in FIG. 7, the current in inductor $L_1$ is kept flowing by the alternating opening of switches $Q_1$ and $D_1$ producing a voltage across electrochromic cell 24. For a drive signal applied to electrochromic element 24 that varies from approximately 0 volts DC to 1.5 $DC_1$ the ripple across electrochromic cell 24 as represented by "RIPPLE" in FIG. 5 may be less than 200 millivolts and preferably less than 100 millivolts.

In the illustrative embodiment, switch $Q_1$ is a transistor, such as a bipolar transistor, a P channel field effect transistor, an N channel field effect transistor, or the like. Switch $D_1$ is a diode, but could be replaced with a bipolar transistor, a P channel field effect transistor, an N channel field effect transistor, or the like. Switch $Q_2$ may be a bipolar transistor, P channel or N channel field effector transistor, or the like. Capacitor $C_1$ is for the purpose of reducing ripple on the voltage applied to electrochromic cell 24. While the capacitance $C_{CELL}$ of the model of electrochromic cell 24 is substantially larger than the capacitance of capacitor $C_1$, capacitor $C_1$ avoids undesirable voltage spikes being applied to electrochromic cell 24 as a result of series resistor $R_1$.

Figure 6:
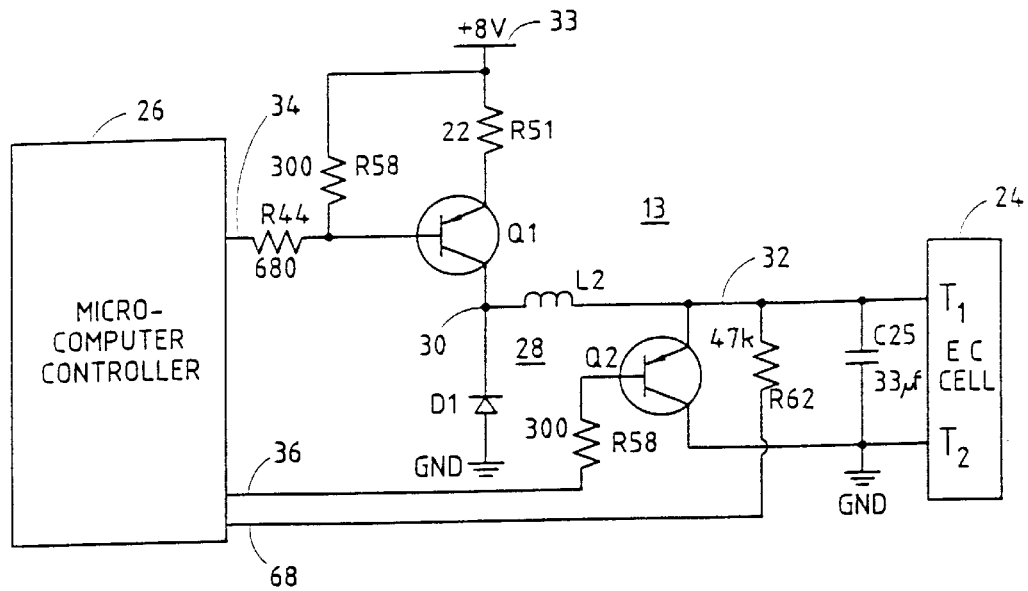
FIG. 6 is a tailed circuit diagram of the drive circuit in FIG. 5.
Figure 7:
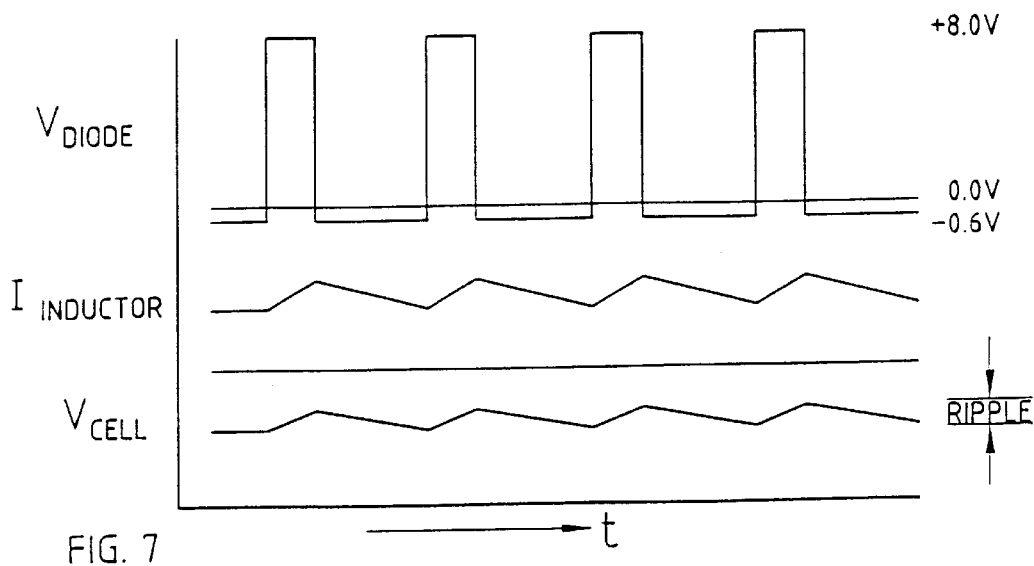
FIG. 7 is a diagram showing waveforms of various electrical signals generated by the drive circuit in FIG. 6

A detailed embodiment of drive circuit 13 is set forth in FIG. 6. A microcomputer controller 26 has an output 34 which supplies a Pulse-Width Modulated (PWM) signal through a resistor R44 to the base of a PNP bipolar transistor $Q_1$ It should be understood that $Q_1$ transistors could alternatively be an NPN transistor or MOSFET with suitable adjustments to circuit configuration. Transistor $Q_1$ is supplied through a 22 ohm resistor R51 to a voltage source 33 which may be in the range of from 5 volts DC to 16 volts DC and preferably between 8 volts and 12 volts and most preferably approximately 8 volts DC. Transistor Q, is in electrical series connection with inductor $L_2$ between voltage source 33 and electrochromic cell 24. The purpose of series resistor R51 is in order to reduce any over-voltage condition on electrochromic cell 24 should transistor $Q_1$ remain closed for any reason. Diode $D_1$ is connected between junction 30 and ground. Microcomputer 26 has a second output 36 which is supplied through a resistor R58 to the base of an NPN transistor $Q_2$ which is connected across the terminals $T_1$ and $T_2$ of electrochromic element 24. Microcomputer 26 activates output 36 in order to rapidly dissipate voltage across electrochromic reflective element 24 thereby rapidly driving the reflective element to a high reflectance level. Microcontroller 26 has an input 68 which is connected through a resistor R62 to terminal $T_1$ of electrochromic reflective element 24. The purpose of input 68 is to allow microcomputer 26 to monitor the voltage across electrochromic reflective element 24, which is proportional to the light transmittance of electrochromic reflective element 24, thereby providing an indication of the reflectance level of the exterior electrochromic mirror assembly 19.

In operation, microcomputer 26 samples light levels sensed by light sensors 20, 22 and supplies a PWM signal on its output 34 sufficient to alternatingly drive transistor $Q_1$ between a saturated state and an open-circuit state. The proportion in time of the PWM signal outputted by microcomputer 26 on output 34 that $Q_1$ is saturated varies in duty cycle from approximately 0 percent to 65 percent, preferably from 0 percent to 50 percent and most preferably from 0 percent to 30 percent. The higher the portion of the duty cycle during which $Q_1$ is saturated, the higher voltage supplied to electrochromic cell 24. The repetition rate of the signal supplied to output 34 is preferably above the allowable range of human hearing, such as 15 kilohertz or higher. Microcomputer controller 26 periodically samples the voltage on input 68 in order to be apprised of the voltage across the electrochromic element which is indicative of the reflectance level of the corresponding rearview mirror assembly. Preferably, the periodic voltage sampling is carried out at a consistent portion of the waveform applied to electrochromic element 24 in order to avoid oscillation in the feedback loop. Most preferably, the voltage sample is taken during a period when transistor $Q_1$ is not conducting. This provides a more accurate determination of the residual charge on the electrochromic cell. As disclosed in commonly assigned patent application Ser. No. 08/832,380, filed on Apr. 2, 1997, the disclosure of which is hereby incorporated herein by reference, microcomputer 26 may additionally supply a voltage to electrochromic cell 24 that is temporarily higher than permissible prolonged coloration voltage levels in order to rapidly change the transmittance of electrochromic cell 24 such as when a vehicle with bright headlights pulls up behind vehicle 9. Under such conditions, microcomputer 26 is able to ensure that the over voltage supplied to electrochromic cell 24 is kept within a safe level by monitoring input 68.

However, it should be understood that even during normal operating conditions, or steady-state conditions, in which electrochromic cell 24 is not being driven in an over voltage condition, it may still be desirable to monitor the voltage across electrochromic cell 24 to endeavor that the desired reflectance level calculated by microcomputer 26 in response to inputs received from sensors 20, 22 corresponds with the actual reflectance level produced by switching power supply 28. For example, monitoring of the voltage across the electrochromic reflective element allows the same drive circuit to be able to drive a wide variety of reflective element surface areas. For example, an electrochromic reflective element utilized as an interior mirror of a vehicle may have a surface area in the range of 90 $cm^2$ to 150 $cm^2$ and typically in the range of 110 $cm^2$ to 130 $cm^2$. A steady state steady-state reflectance level current draw, after color transitions have settled, is typically in the range of between 60 milliamperes and 180 milliamperes with a range of 80 milliamperes to 150 milliamperes being typical. Exterior rearview mirrors can be even larger with a surface area of approximately 350 $cm^2$, and greater, with a commensurate increase in current. Furthermore, in cases where the drive circuit is driven directly from an unregulated supply, such as vehicle battery or ignition voltage, monitoring voltage across the cell facilitates a more stable and accurate drive signal being applied to the electrochromic reflective element notwithstanding significant variation in supply voltage.

Furthermore, temperature variation experienced in the mirror assembly, especially exterior mirror assemblies, can significantly alter the current of the drive signal needed to achieve a particular voltage and, hence, the desired reflectance level. By monitoring voltage level across the electrochromic reflectance element, drive circuit 13 can accommodate such variation in surface area, temperature, and the like. It may also be advantageous to provide an input from a temperature sensor to microcomputer 26 indicative of the environment the electrochromic reflective element is operating in. This is especially relevant in the case of exterior electrochromic rearview mirror assembly 19, which is exposed to a wide range of temperature. However, temperature monitoring may also be used with the interior electrochromic rearview mirror assembly 11. Microcomputer 26 may use the information on the temperature environment of the electrochromic reflective element to enhance the monitoring of the voltage across the electrochromic reflective element and producing a resulting voltage across the reflective element, such as by varying the duty cycle of the switching power supply. This is because the relationship between the voltage across the reflective element and its reflectivity is non-linear, with the non-linearity related to the temperature environment of the electrochromic reflective element.

Although switching power supply 28 is illustrated as a buck converter made up of individual discrete components, other configurations are possible. The individual components of the buck converter could be combined into an integrated circuit package of the type which is commercially available. Additionally, the inductor could be replaced with a resistor. Although energy efficiency would be reduced, the reduction may be acceptable especially in view of the cost reduction realized by eliminating a rather costly component, the inductor. Instead of adjusting the voltage level of the output of buck converter 28 by varying the duty cycle of a PWM signal applied to its input, any type of waveform, such as a DC voltage level, from the microcomputer to the switching power supply may be varied in order to control switching power supply 28. Alternatively, a PWM pulse signal produced by the microcomputer could be integrated prior to being supplied as an input to such alternative switching power supply. Other suitable means for signaling the desired output of the switching power supply may be used.

Because transistors $Q_1$ and diode $D_6$ are operated in a saturated mode, exceptional energy utilization efficiency is realized. In the illustrated embodiment, switching power supply, or switching step-down converter 28, operates at an efficiency level of at least 75 percent and may achieve an 85 or even 95 percent energy efficiency. Because a high energy efficiency reduces the amount of energy which must be removed as waste heat, the component size and heat dissipation requirements are substantially reduced.

Figure 4:
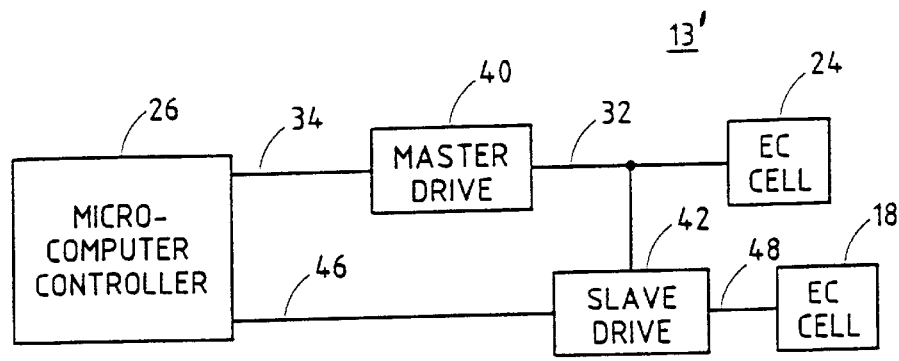
FIG. 4 is a block diagram of a master/slave drive circuit according to the invention.
Figures 8, 9:
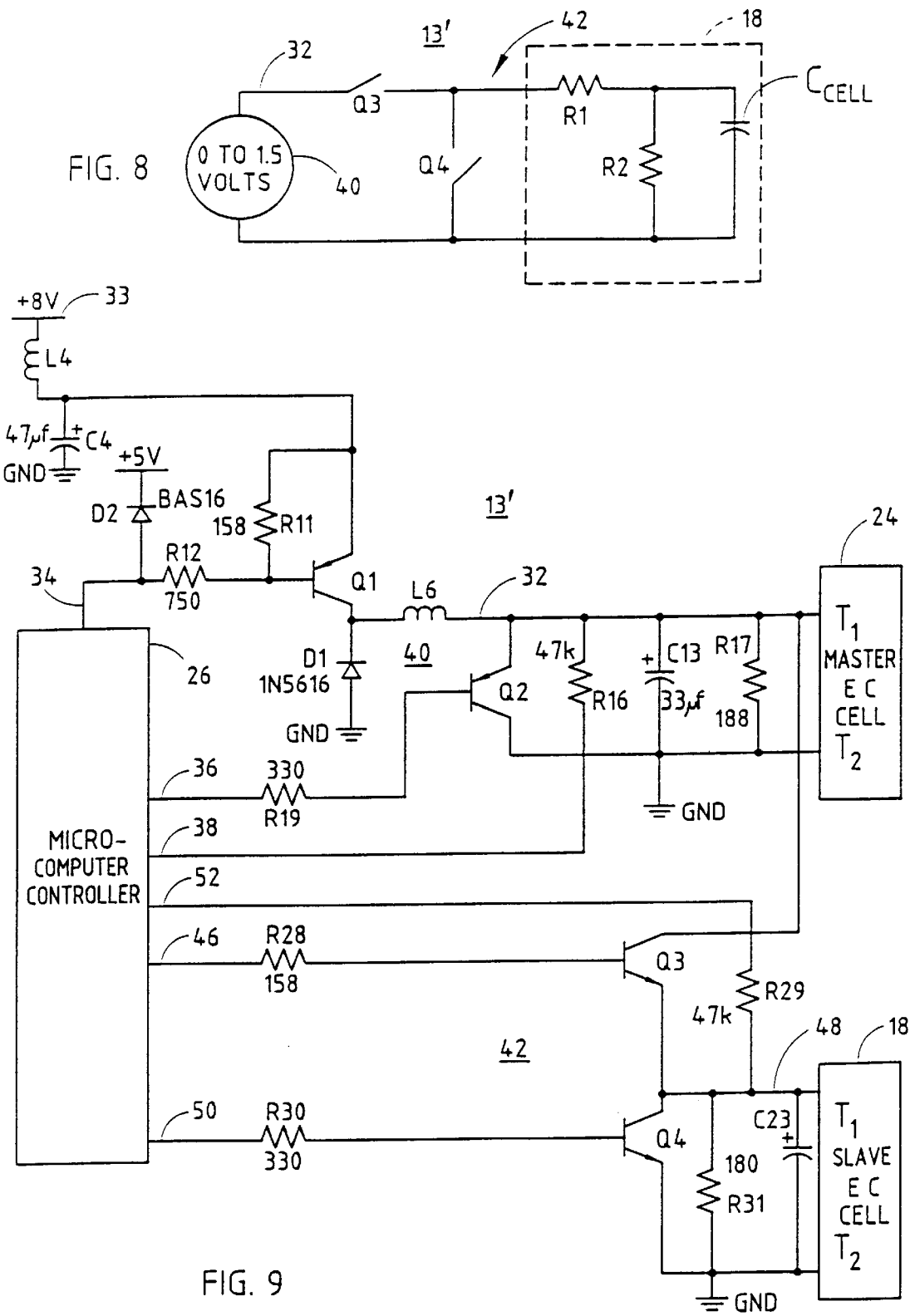
FIG. 8 is a generalized circuit diagram of a slave drive circuit according to the invention.
FIG. 9 is a detailed schematic diagram of the master/slave drive circuit in FIG. 4.

In an alternative electrochromic mirror system for a vehicle, an electronic control has a drive circuit 13' including a master drive circuit 40 and a slave drive circuit 42 (FIGS. 4, 8 and 9). Master drive circuit 40, which is illustrated in FIG. 8 as a voltage source, produces a drive signal at its output 32 which may be supplied to an electrochromic reflective element 24. Slave drive circuit 42 derives from output 32 a second signal which is supplied to another rearview mirror electrochromic reflective element 18. In the illustrated embodiment, master drive circuit may be of the type illustrated in FIGS. 5 and 6, although other commonly available drive circuits, such as the type disclosed in Bechtel et al. U.S. Pat. No. 5,451,822, could be utilized. Slave drive circuit 42 includes a first electronic switch $Q_3$ in electrical series connection between master drive circuit 40 and electrochromic reflective element 18 and a second electronic switch $Q_4$ which shunts electrochromic reflective element 18 when closed. Electronic switch $Q_4$ is for the purpose of rapidly discharging accumulated charge on electrochromic reflective element 18 when it is desired to rapidly increase the reflectivity of the associated reflective element such as when the vehicle is replaced in reverse gear.

Electronic switch $Q_3$ is opened and closed in a PWM fashion in order to supply a pulsed DC voltage to slave driven electrochromic reflective element 18 that is derived from the drive signal produced by the master drive circuit 32. The drive signal supplied to slave electrochromic reflective element 18 is at a level that is less than or equal to the master drive signal at 32. If transistor $Q_3$ is closed 100 percent of the time, then the slave drive signal supplied to slave electrochromic element 18 will be equal to the master drive signal supplied to master cell 24. As the duty cycle of electronic switch $Q_3$ being in a saturated state decreases below 100 percent, the slave voltage supplied to electrochromic element 18 will decrease as a proportion of master drive signal 44 supplied to electrochromic element 24. In the illustrated embodiment, switch $Q_3$ is operated at a duty cycle that is greater than or equal to 65 percent and preferably in a range of between 75 percent and 100 percent. Advantageously, transistor $Q_3$ can be operated at a relatively slow repetition rate without producing undesirable ripple in the voltage supplied to slave electrochromic element 18. This is accomplished by utilizing the significant capacitance $C_{CELL}$ of electrochromic element 18.

Preferably, electronic switch $Q_3$ is operated at a pulse repetition rate that is at the low end of the audio perception of humans, but above a rate that may produce noticeable flicker; namely, below 200 hertz and preferably less than or equal to 100 hertz. Most preferably, the pulse repetition rate of electronic switch $Q_3$ is approximately 50 hertz. In addition to allowing the repetition rate of electronic switch $Q_3$ to be relatively low, the large capacitance of electrochromic cell 15 allows the change in reflectance level thereof to be changed in relatively coarse steps. For example, the change in duty cycle of electronic switch $Q_3$ could be changed in 5 percent steps, 10 percent steps, or even 15 percent steps. This results in a lessening of the software requirement for controlling the slave drive. Alternatively, switches $Q_1$ and $D_1$ of master drive 40 could operate at a repetition rate below human audible reception and switches $Q_4$ of slave drive 42 operate at a rate above human audible perception.

In the illustrated embodiment, slave drive circuit 42 supplies a drive signal to electrochromic element 18 that is part of interior electrochromic mirror assembly 11 and master drive circuit 40 supplies a drive signal to electrochromic element 24 that is a part of exterior electrochromic rearview mirror assembly 19 of which two are preferred on a vehicle. This is based upon a preference that the reflectance level of the interior rearview mirror should be no less than the reflectance level of the exterior rearview mirrors. This arrangement is particularly advantageous in providing a relationship between the reflectivity of the interior rearview mirror assembly and exterior rearview mirror assemblies that takes into account the configuration of the vehicle as disclosed in commonly assigned provisional patent applications Ser. No. 60/103,721 filed on Oct. 9, 1998, by Kenneth Schofield and Kenneth L. Schierbeek, and Ser. No. 60/117, 633 filed on Jan. 28, 1999, by Kenneth Schofield and Kenneth L. Schierbeek, the disclosures of which are hereby incorporated herein by reference. However, it may be desirable for particular applications to drive the interior electrochromic reflective element with the master drive circuit and one or both exterior electrochromic reflective elements with the slave drive circuit. Although a master/slave drive circuit according to the invention has more design constraints than other known electrochromic mirror systems, which provide independent drive signals for each mirror controlled, it has been discovered that any differences are not perceived by the driver.

A detailed embodiment of drive circuit 13' is illustrated in FIG. 9 in which an inductor $L_4$ and capacitor $C_4$ filter noise for a voltage source 33 to the emitter of transistor $Q_1$. A diode $D_2$ is connected from output 34 of microcomputer 26 to a voltage source, such as 5 volts. The purpose of diode $D_2$ is to clip any voltage spikes that may be fed to line 34 such as from inductor $L_6$. Otherwise, the master drive of drive circuit 13' is identical with switching power supply 28 in FIG. 6. Microcomputer 26 has an output 46 which supplies a PWM drive signal to an NPN transistor $Q_3$. The emitter of transistor $Q_3$ is supplied at 48 to a terminal of slave electrochromic element 18. Transistor $Q_3$ selectively interconnects line 48, which supplies a drive signal to slave electrochromic element 18, with line 32 which supplies a drive signal to master electrochromic cell 24. Transistor $Q_3$ is selectively switched between an open state and a saturated state in response to an output 46 from microcomputer 26. By varying the duty cycle of the PWM signal at output 46, microcontroller 26 selectively adjusts the relative proportion between the drive signal supplied to slave electrochromic element 18 and the drive signal supplied to master electrochromic element 24. Microcomputer 26 additionally has an output 50 which is supplied to a base of a transistor $Q_4$. Transistor $Q_4$ is connected between line 48 and ground. When microcomputer 26 switches transistor $Q_4$ to a saturated state, electrical charge on slave electrochromic reflective element 18 is rapidly dissipated. Transistors $Q_3$ and $Q_4$ are placed in saturation at different times. Microcomputer 26 additionally receives an input at 52 which is connected through a resistor R29 to line 48. Input 52 supplies to microcomputer 26 a signal representative of the voltage across slave electrochromic element 18.

In operation, microcomputer 26 determines a desired reflectance level for interior electrochromic rearview mirror assembly 11 and electrochromic exterior mirror assembly 19. The values of desired reflectance level may be established, by way of example, from the respective light levels sensed by light sensors 20, 22 as well as the configuration of the vehicle as set forth in commonly assigned provisional patent application Ser. No. 60/117,633, filed by Kenneth Schofield et al. on Jan. 28, 1999, the disclosure of which is hereby incorporated herein by reference. The microcomputer controller then selects a duty cycle for the PWM signal supplied at output 34 to transistor $Q_1$. The selected duty cycle may take into account, by way of example, the voltage across master electrochromic cell 24 as monitored by input 38 from line 44 and the degree of change in reflectance level desired. The PWM signal supplied at output 34 produces a voltage level at line 32 which is monitored by the microcomputer at input 38. If master electrochromic element 24 is being switched to a substantially lower transmissivity, it may be desirable to momentarily increase the voltage supplied to the master electrochromic cell in order to rapidly modify the transmissivity of the cell. During such transitions, microcomputer 38 may more frequently monitor the voltage at line 44 in order to ensure that any temporary over voltage condition of master electrochromic element 24 is kept within a prescribed maximum voltage level. Values of maximum voltage level, as well as PWM duty cycles, may be selected according to the principles disclosed in commonly assigned application Ser. No. 08/832,380, entitled DIGITAL ELECTROCHROMIC MIRROR SYSTEM, filed on Apr. 2, 1997, by Kenneth L. Schierbeek, the disclosure of which is hereby incorporated herein by reference. If microcomputer controller 26 determines that the reflectance level of master electrochromic element 24 should be substantially increased, then the PWM signal would be disconnected from output 34 and output 36 energized in order to place transistor $Q_2$ in a saturated condition. This will rapidly dissipate charge on master electrochromic element 24 to increase the transmissivity thereof.

Microcomputer controller 26 additionally selects a duty cycle for a PWM signal supplied at output 46. The PWM signal will be selected at least as a function of the desired reflectance level for slave electrochromic element 18. The selected duty cycle may take into account the current reflectance level of master electrochromic element 24 represented at least in part by the voltage across slave electrochromic element 18 on line 48, as monitored by input 52 to the microcomputer. Once a duty cycle is selected, microcomputer 26 produces a PWM signal at output 46. Microcomputer 26 may choose to dwell on a particular duty cycle at output 46 unless the calculated duty cycle change is more than a given percent. In the illustrated embodiment, the duty cycle is not changed by microcomputer 26 unless the calculated duty cycle change is at least 5 percent, more preferably at least 10 percent and most preferably at least 15 percent. If the calculated duty cycle of slave electrochromic reflective element 18 results in a substantial increase in the transmissivity of reflective element 18, then microcomputer 26 removes the PWM signal from output 46 and supplies an output at 50 to cause transistor $Q_4$ to enter a saturated mode which quickly dissipates any charge from line 48 thereby rapidly increasing the transmissivity of slave electrochromic element 18.

Drive signal 48 applied to interior electrochromic reflective element 18 is compensated for the thermal environment of interior electrochromic mirror assembly 11 as well as the surface area, present reflectance level, and the like, of interior electrochromic reflective element 18. This is accomplished by drive circuit 13' monitoring voltage across electrochromic reflective element 18 as supplied to input 52 of microcomputer 26. Drive signal 32 applied to exterior electrochromic reflective element 24 is compensated for the thermal environment of exterior electrochromic mirror assembly 19, as well as the surface area, present reflectance level, and the like, of exterior electrochromic reflective element 24. This is accomplished by drive circuit 13' monitoring voltage across electrochromic reflective element 24 as supplied to input 38 of microcomputer 26. In this manner, drive circuit 13 can compensate for different thermal environments of interior and exterior electrochromic mirror assemblies 11, 19. Additionally, microcomputer 26 may receive temperature sensor inputs for any of the interior and/or electrochromic exterior rearview mirror assemblies to further compensate for different thermal environments. This additional input or inputs may assist microcomputer 26 in reducing effects created by non-linearity in the relationship between voltage across the electrochromic reflective element and its reflectance level for different temperatures.

Although transistor $Q_3$ is illustrated as operated in a saturated mode at a particular PWM, the slave drive could alternatively be a transistor drive in a non-saturated state either continuously or at a PWM.

The present invention, although illustrated with one master electrochromic reflective element and one slave electrochromic reflective element, could be utilized with two master drive circuits to drive two electrochromic reflective elements, such as for two exterior rearview mirror assemblies and one slave electrochromic element which is slave to one of the master drive circuits. Alternatively, an electrochromic mirror system may utilize one master electrochromic element to drive one exterior electrochromic rearview mirror and two slave electrochromic elements, each driven to an independently or tandemly controlled partial reflectance level that is higher than the partial reflectance level of the master rearview assembly. Other variations may suggest themselves to the skilled artisan.

Figure 10:
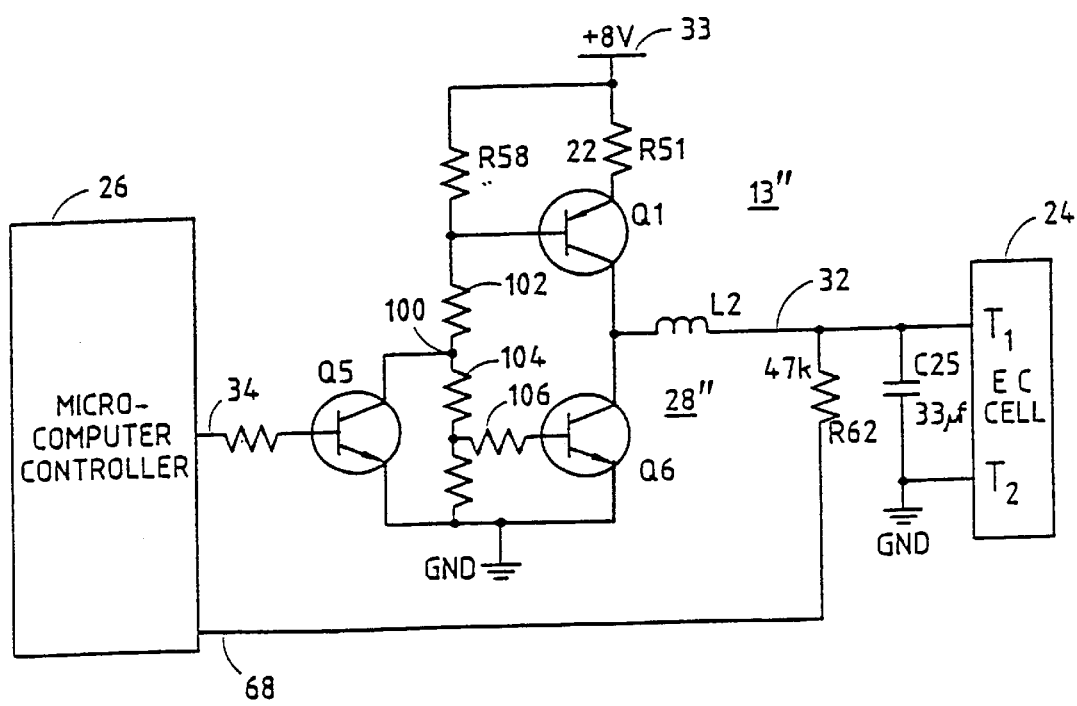
FIG. 10 is the same view as FIG. 6 of an alternative embodiment.
Figure 3:
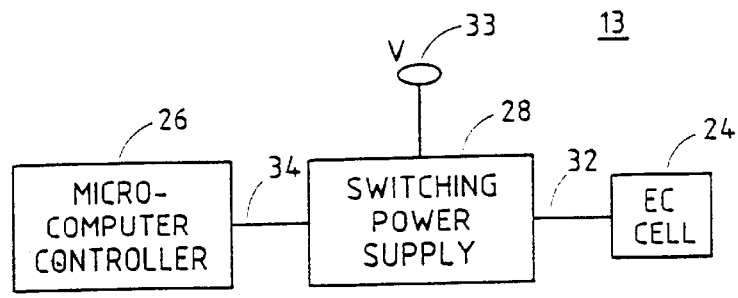
FIG. 3 is a block diagram of a drive circuit according to the invention.

In yet a further embodiment, a drive circuit 13" utilizes a transistor $Q_6$ to replace both the functions of diode $D_1$ and bleaching transistor $Q_2$ (FIG. 10). As will be observed from FIG. 10, microcontroller 26 includes a single output 34 which is supplied to the base of a transistor $Q_5$ whose collector is connected to a junction 100 which is supplied through a resistor 102 to the base of transistor $Q_1$ and to resistors 104 and 106 to the base of transistor $Q_6$. When microcomputer 26 drives transistor $Q_5$ into saturation, transistor $Q_1$ is switched into saturation, and $Q_6$ is cut off. During such portion of the cycle, energy is stored in inductor $L_2$ and a current is forced through electrochromic reflective element 24. When microcomputer controller 26 switches transistor $Q_5$ into an open circuit condition, transistor $Q_1$ is switched into an open circuit condition and transistor $Q_6$ is switched into saturation. This causes a current to continue to flow through inductor $L_2$ and electrochromic reflective element 24 as the energy from inductor $L_2$ is dissipated. As microcomputer controller 26 switches transistor $Q_5$ according to a rectangular wave, electrochromic reflective element 24 is provided with a drive signal whose voltage is proportional to the duty cycle of such rectangular wave. If it is decided by microcomputer controller 26 to rapidly increase the reflectivity of electrochromic reflective element 24 by rapidly dissipating the charge accumulated thereon, microcomputer 26 holds output 34 in a low state which causes transistor $Q_5$ to be open-circuited and transistor $Q_6$ to be driven to saturation. This rapidly dissipates any charge on electrochromic reflective element 24. When microcomputer controller 26 once again determines the need to decrease the reflectivity of electrochromic reflective element 24, it applies a rectangular waveform to its output 34, thereby applying a drive signal as previously described. By suitable circuit modifications, transistors $Q_5$ and $Q_6$ can each be bipolar transistors, N channel field effect transistors, P channel field effect transistors, or the like.

The functions performed by microcomputer 26 could be implemented by any circuit capable of generating a digital signal including a programmable computer, a dedicated digital logic circuit, or the like. Preferably, the components making up electronic control 13, 13', 13" are commonly mounted in housing 14 of interior electrochromic mirror assembly 11 as disclosed in commonly assigned U.S. Pat. No. 5,424,898, the disclosure of which is hereby incorporated herein by reference. However, it should be understood that the components could alternatively be located in exterior electrochromic mirror assembly 19 or in a location separate from the mirror assemblies as disclosed in commonly assigned U.S. Pat. No. 5,659,423, the disclosure of which is hereby incorporated herein by reference.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A vehicular electrochromic rearview mirror system, comprising:
    an interior electrochromic rearview mirror assembly having an interior electrochromic reflective element that assumes a partial reflectance level in response to a first drive signal applied thereto;
    at least one exterior electrochromic rearview mirror assembly having an exterior electrochromic reflective element that assumes a partial reflectance level in response to a second drive signal applied thereto; and
    a drive circuit supplying a first drive signal to said interior electrochromic reflective element and a second drive signal to said exterior electrochromic reflective element, said drive circuit variably controlling a relationship between the partial reflectance levels of said interior electrochromic reflective element and said exterior electrochromic reflective element by a control signal, whereby said interior electrochromic reflective element has a partial reflectance level that is greater than or equal to the partial reflectance level of said exterior electrochromic reflective element.

2. The vehicular electrochromic rearview mirror system in claim 1 wherein said control signal comprises a pulse width modulated signal.

3. The vehicular electrochromic rearview mirror system in claim 2 wherein said drive circuit comprises a microcontroller.

4. The vehicular electrochromic rearview mirror system in claim 2 including a proportional controller supplying one of said drive signals.

5. The vehicular electrochromic rearview mirror system in claim 1 wherein said at least one electrochromic exterior rearview mirror comprises a driver-side exterior rearview mirror and a passenger-side rearview mirror.

6. The vehicular electrochromic rearview mirror system in claim 1 including a proportional controller supplying one of said drive signals.

7. The vehicular electrochromic rearview mirror system in claim 1 wherein said first drive signal is supplied from a circuit comprising a first electronic switch and said second drive signal is supplied from another circuit comprising a second electronic switch.

8. The vehicular electrochromic rearview mirror system in claim 7 including a microcontroller operating said first electronic switch at a first repetition rate and said second electronic switch at a second repetition rate.

9. The vehicular electrochromic rearview mirror system in claim 8 wherein one said repetition rate is at a high end of human hearing frequencies and another said repetition rate is at a low end of human hearing frequencies.

10. The vehicular electrochromic rearview mirror system in claim 9 wherein said second repetition rate is at a high end of human hearing frequencies and said first repetition rate is at a low end of human hearing frequencies.

11. The vehicular electrochromic rearview mirror system in claim 8 wherein said microcontroller operates said second electronic switch during steady-state reflectance levels at a duty cycle of less than or equal to 65%.

12. The vehicular electrochromic rearview mirror system in claim 11 wherein said microcontroller operates said first electronic switch during steady-state reflectance levels at a duty cycle greater than or equal to 65%.

13. The vehicular electrochromic rearview mirror system in claim 12 wherein said microcontroller operates said second electronic switch during steady-state reflectance levels at a duty cycle in a range of between 0% and 50%.

14. The vehicular electrochromic rearview mirror system in claim 13 wherein said microcontroller operates said first electronic switch during steady-state reflectance levels at a duty cycle in a range of between 75% and 100%.

15. The vehicular electrochromic rearview mirror system in claim 7 wherein said first and second electronic switches are comprised of transistors.

16. The vehicular electrochromic rearview mirror system in claim 7 wherein said first and second electronic switches comprise one of a bipolar transistor and a field-effect transistor.

17. The vehicular electrochromic rearview mirror system in claim 7 wherein said first and second electronic switches are operated in saturated modes.

18. The vehicular electrochromic rearview mirror system in claim 7 wherein said drive circuit monitors voltage across at least one of said reflective elements and controls at least one of said first and second switches at least in part as a function of monitored voltage.

19. The vehicular electrochromic rearview mirror system in claim 7 wherein said drive circuit monitors voltage across said interior electrochromic reflective elements and controls said first electronic switch at least in part as a function of the monitored voltage.

20. The vehicular electrochromic rearview mirror system in claim 19 wherein said drive circuit monitors voltage across said exterior electrochromic reflective elements and controls said second electronic switch at least in part as a function of the monitored voltage.

21. The vehicular electrochromic rearview mirror system in claim 7 wherein said drive circuit monitors voltage across said exterior electrochromic reflective elements and controls said second electronic switch at least in part as a function of the monitored voltage.

22. The vehicular electrochromic rearview mirror system in claim 1 wherein said drive circuit comprises a switching power supply.

23. The vehicular electrochromic rearview mirror system in claim 22 wherein said switching power supply comprises an impedance device and an electronic switch in series electrical connection between the associated one of said electrochromic reflective elements and a voltage potential.

24. The vehicular electrochromic rearview mirror system in claim 23 wherein said impedance device has energy storing capability.

25. The vehicular electrochromic rearview mirror system in claim 23 wherein said impedance device comprises an inductor.

26. The vehicular electrochromic rearview mirror system in claim 23 wherein said voltage potential comprises a voltage in the range from 5 volts DC to 16 volts DC.

27. The vehicular electrochromic rearview mirror system in claim 26 wherein said voltage potential comprises a voltage of approximately 8 volts DC.

28. A vehicular electrochromic rearview mirror system, comprising:
an interior electrochromic rearview mirror assembly having an interior electrochromic reflective element that assumes a partial reflectance level in response to a voltage applied thereto;
at least one exterior electrochromic rearview mirror assembly having an exterior electrochromic reflective element that assumes a partial reflectance level in response to a second voltage applied thereto; and
a digital drive circuit comprising a microcontroller, said digital drive circuit supplying a first voltage to said interior electrochromic reflective element and a second voltage to said exterior electrochromic reflective element, said first voltage being no greater than said second voltage, whereby said interior electrochromic reflective element has a partial reflectance level that is greater than or equal to the partial reflectance level of said exterior electrochromic reflective element, and wherein said microcontroller supplies a pulse width modulated signal controlling a proportion between said first and second voltages.

29. The vehicular electrochromic rearview mirror system in claim 28 wherein said at least one electrochromic exterior rearview mirror comprises a driver-side exterior rearview mirror and a passenger-side rearview mirror.

30. The vehicular electrochromic rearview mirror system in claim 28 including a proportional controller supplying one of said drive signals as a function of said pulse width modulated signal.

31. The vehicular electrochromic rearview mirror system in claim 28 wherein said first voltage is supplied from a circuit comprising a first electronic switch and said second voltage is supplied from another circuit comprising a second electronic switch.

32. The vehicular electrochromic rearview mirror system in claim 31 wherein said microcontroller operates said first electronic switch at a first repetition rate and said second electronic switch at a second repetition rate.

33. The vehicular electrochromic rearview mirror system in claim 32 wherein one said repetition rate is at a high end of human hearing frequencies and another said repetition rate is at a low end of human hearing frequencies.

34. The vehicular electrochromic rearview mirror system in claim 33 wherein said second repetition rate is at a high end of human hearing frequencies and said first repetition rate is at a low end of human hearing frequencies.

35. The vehicular electrochromic rearview mirror system in claim 32 wherein said microcontroller operates said second electronic switch during steady-state reflectance levels at a duty cycle of less than or equal to 65%.

36. The vehicular electrochromic rearview mirror system in claim 35 wherein said microcontroller operates said first electronic switch during steady-state reflectance levels at a duty cycle greater than or equal to 65%.

37. The vehicular electrochromic rearview mirror system in claim 36 wherein said microcontroller operates said second electronic switch during steady-state reflectance levels at a duty cycle in a range of between 0% and 50%.

38. The vehicular electrochromic rearview mirror system in claim 37 wherein said controller operates said first electronic switch during steady-state reflectance levels at a duty cycle in a range of between 75% and 100%.

39. The vehicular electrochromic rearview mirror system in claim 31 wherein said first and second electronic switches are comprised of transistors.

40. The vehicular electrochromic rearview mirror system in claim 39 wherein said first and second electronic switches comprise one of a bipolar transistor and a field-effect transistor.

41. The vehicular electrochromic rearview mirror system in claim 31 wherein said first and second electronic switches are operated in saturated modes.

42. The vehicular electrochromic rearview mirror system in claim 31 wherein said digital drive circuit monitors voltage across at least one of said reflective elements and controls at least one of said first and second switches at least in part as a function of monitored voltage.

43. The vehicular electrochromic rearview mirror system in claim 31 wherein said digital drive circuit monitors voltage across said interior electrochromic reflective elements and controls said first electronic switch at least in part as a function of the monitored voltage.

44. The vehicular electrochromic rearview mirror system in claim 43 wherein said drive circuit monitors voltage across said exterior electrochromic reflective elements and controls said second electronic switch at least in part as a function of the monitored voltage.

45. The vehicular electrochromic rearview mirror system in claim 31 wherein said drive circuit monitors voltage across said exterior electrochromic reflective elements and controls said second electronic switch at least in part as a function of the monitored voltage.

46. The vehicular electrochromic rearview mirror system in claim 28 wherein said digital drive circuit comprises a switching power supply.

47. The vehicular electrochromic rearview mirror system in claim 46 wherein said switching power supply comprises an impedance device and an electronic switch in series electrical connection between the associated one of said electrochromic reflective elements and a voltage potential.

48. The vehicular electrochromic rearview mirror system in claim 47 wherein said impedance device has energy storing capability.

49. The vehicular electrochromic rearview mirror system in claim 47 wherein said impedance device comprises an inductor.

50. The vehicular electrochromic rearview mirror system in claim 47 wherein said voltage potential comprises a voltage in the range from 5 volts DC to 16 volts DC.

51. The vehicular electrochromic rearview mirror system in claim 50 wherein said voltage potential comprises a voltage of approximately 8 volts DC.

52. A vehicular electrochromic rearview mirror system, comprising:
an interior electrochromic rearview mirror assembly having an interior electrochromic reflective element that assumes a partial reflectance level in response to a first drive signal applied thereto;
a first exterior electrochromic rearview mirror assembly having a first exterior electrochromic reflective element that assumes a partial reflectance level in response to a second drive signal applied thereto;
a second exterior electrochromic rearview mirror assembly having a second exterior electrochromic reflective element that assumes a partial reflectance level in response to a third drive signal applied thereto; and
a digital drive circuit comprising a microcontroller, said digital drive circuit supplying a first drive signal to said interior electrochromic reflective element, a second drive signal to said first exterior electrochromic reflective element and a third drive signal to said second exterior electrochromic reflective element, said digital drive circuit variably controlling a relationship among the partial reflectance levels of said interior electrochromic reflective element, said first exterior electrochromic reflective element and said second exterior electrochromic reflective element by at least first and second pulse width modulated control signals.

53. The vehicular electrochromic rearview mirror system in claim 52 wherein said first electrochromic exterior rearview mirror comprises a driver-side exterior rearview mirror and said second electrochromic exterior rearview mirror comprises a passenger-side rearview mirror.

54. The vehicular electrochromic rearview mirror system in claim 52 including a first proportional controller supplying one of said drive signals as a function of said first pulse width modulated signal and a second proportional controller supplying another of said drive signals as a function of said second pulse width modulated signal.

55. The vehicular electrochromic rearview mirror system in claim 52 wherein said first drive signal is supplied from a first circuit comprising a first electronic switch, said second drive signal is supplied from a second circuit comprising a second electronic switch and said third drive signal is supplied from a third circuit comprising a third electronic switch.

56. The vehicular electrochromic rearview mirror system in claim 55 wherein said microcontroller operates said first electronic switch at a first repetition rate, said second electronic switch at a second repetition rate and said third electronic switch at a third repetition rate.

57. The vehicular electrochromic rearview mirror system in claim 56 wherein said microcontroller operates at least one of said second and third electronic switches during steady-state reflectance levels at a duty cycle of less than or equal to 65%.

58. The vehicular electrochromic rearview mirror system in claim 57 wherein said microcontroller operates at least said first electronic switch during steady-state reflectance levels at a duty cycle greater than or equal to 65%.

59. The vehicular electrochromic rearview mirror system in claim 58 wherein said microcontroller operates said at least one of said second and third electronic switches during steady-state reflectance levels at a duty cycle in a range of between 0% and 50%.

60. The vehicular electrochromic rearview mirror system in claim 59 wherein said controller operates at least said first electronic switch during steady-state reflectance levels at a duty cycle in a range of between 75% and 100%.

61. The vehicular electrochromic rearview mirror system in claim 56 wherein said digital drive circuit monitors voltage across said interior electrochromic reflective element and controls said first electronic switch at least in part as a function of the monitored voltage.

62. The vehicular electrochromic rearview mirror system in claim 55 wherein said first, second and third electronic switches are comprised of transistors.

63. The vehicular electrochromic rearview mirror system in claim 62 wherein said first, second and third electronic switches comprise one of a bipolar transistor and a field-effect transistor.

64. The vehicular electrochromic rearview mirror system in claim 55 wherein said first, second and third electronic switches are operated in saturated modes.

65. The vehicular electrochromic rearview mirror system in claim 64 wherein said drive circuit monitors voltage across said first exterior electrochromic reflective element and controls said second electronic switch at least in part as a function of the monitored voltage.

66. The vehicular electrochromic rearview mirror system in claim 55 wherein said digital drive circuit monitors voltage across at least one of said reflective elements and controls at least one of said first, second and third switches at least in part as a function of monitored voltage.

67. The vehicular electrochromic rearview mirror system in claim 66 wherein said drive circuit monitors voltage across said second exterior electrochromic reflective element and controls said third electronic switch at least in part as a function of the monitored voltage.

68. The vehicular electrochromic rearview mirror system in claim 52 wherein said digital drive circuit comprises a switching power supply.

69. The vehicular electrochromic rearview mirror system in claim 68 wherein said switching power supply comprises an impedance device and an electronic switch in series electrical connection between the associated one of said electrochromic reflective elements and a voltage potential.

70. The vehicular electrochromic rearview mirror system in claim 69 wherein said impedance device has energy storing capability.

71. The vehicular electrochromic rearview mirror system in claim 70 wherein said impedance device comprises an inductor.

72. The vehicular electrochromic rearview mirror system in claim 69 wherein said voltage potential comprises a voltage in the range from 5 volts DC to 16 volts DC.

73. The vehicular electrochromic rearview mirror system in claim 72 wherein said voltage potential comprises a voltage of approximately 8 volts DC.

* * * * *

UNITED STATES PATENT AND TRADEMARK OFFICE
CERTIFICATE OF CORRECTION

PATENT NO. : 6,299,315 B2
DATED : October 9, 2001
INVENTOR(S) : Eric J. Hoekstra and Kenneth L. Schierbeek It is certified that error appears in the above-identified patent and that said Letters Patent is hereby corrected as shown below:

Column 3,
Line 37, insert -- the -- before "invention"
Line 46, "tailed" should be -- detailed --
Line 49, insert -- ; -- after "Fig. 6"

Column 6,
Line 10, "Pig." should be -- Fig. --
Line 37, "$DC_1$" should be -- DC --
Line 64, "Q" should be -- $Q_1$ --

Column 14,
Line 25, "7" should be -- 15 --

Signed and Sealed this

Eighth Day of April, 2003

JAMES E. ROGAN
*Director of the United States Patent and Trademark Office*